US009885625B2

(12) United States Patent
Wu

(10) Patent No.: US 9,885,625 B2
(45) Date of Patent: Feb. 6, 2018

(54) AIR PUMP WITH PRESSURE GAUGE HAVING INDICATORS ON DIFFERENT SIDES AND MOVABLE BETWEEN USE POSITIONS THEREOF

(71) Applicant: Scott Wu, Taichung (TW)

(72) Inventor: Scott Wu, Taichung (TW)

( * ) Notice: Subject to any disclaimer, the term of this patent is extended or adjusted under 35 U.S.C. 154(b) by 297 days.

(21) Appl. No.: 14/852,654

(22) Filed: Sep. 14, 2015

(65) Prior Publication Data

US 2016/0231185 A1    Aug. 11, 2016

(30) Foreign Application Priority Data

Feb. 10, 2015  (TW) .............................. 104104340 A

(51) Int. Cl.
| | | |
|---|---|---|
| *F04B 53/14* | (2006.01) | |
| *G01L 7/02* | (2006.01) | |
| *F04B 33/00* | (2006.01) | |
| *G01L 17/00* | (2006.01) | |
| *F04B 39/12* | (2006.01) | |
| *F04B 51/00* | (2006.01) | |

(Continued)

(52) U.S. Cl.
CPC .............. *G01L 7/024* (2013.01); *F04B 33/00* (2013.01); *F04B 33/005* (2013.01); *F04B 39/12* (2013.01); *F04B 51/00* (2013.01); *F04B 53/1087* (2013.01); *F04B 53/14* (2013.01); *G01L 17/00* (2013.01); *G01L 19/16* (2013.01)

(58) Field of Classification Search
CPC ..................................................... F04B 33/005
See application file for complete search history.

(56) References Cited

U.S. PATENT DOCUMENTS

| 5,964,577 A | 10/1999 | Chuang |
| 6,805,537 B2* | 10/2004 | Wu ........................ F04B 33/005 |
| | | 417/440 |

(Continued)

FOREIGN PATENT DOCUMENTS

| CN | 102539061 A | 7/2012 |
| DE | 102008056066 B3 | 5/2010 |

(Continued)

OTHER PUBLICATIONS

FTB(TM) Double-Sided Pressure Gauges, http://www.ftb.com.tw/gauges/doublesided.htm, retreived Sep. 1, 2014.*

*Primary Examiner* — Patrick Hamo
(74) *Attorney, Agent, or Firm* — Alan D. Kamrath; Kamrath IP Lawfirm, P.A.

(57) ABSTRACT

An air pump includes a barrel and a pumping device moving with respect to the barrel when the air pump is operated. A joint assembly fluidly connecting to the air pump is disposed on the barrel and includes a first hole to receive air from the air pump, a connecting device including a rotatable adaptor, and a second hole extending through the rotatable adaptor and fluidly connecting to the first hole. A pressure gauge connects to the joint assembly on the rotatable adaptor, includes an air inlet hole fluidly connecting to the second hole, has a first side thereof including a first dial with a first measuring range and a second side thereof including a second dial with a second measuring range different from the first measuring range, and is rotatable between use positions thereof.

16 Claims, 15 Drawing Sheets

(51) Int. Cl.
*F04B 53/10* (2006.01)
*G01L 19/16* (2006.01)

(56) References Cited

U.S. PATENT DOCUMENTS 9,255,571 B2 2/2016 Wang
2003/0194329 A1 10/2003 Wu

FOREIGN PATENT DOCUMENTS

| TW | 511677 U | 11/2002 |
|---|---|---|
| TW | M364772 U | 9/2009 |
| TW | I403644 A | 8/2013 |
| TW | M478742 U | 5/2014 |

\* cited by examiner

AIR PUMP WITH PRESSURE GAUGE HAVING INDICATORS ON DIFFERENT SIDES AND MOVABLE BETWEEN USE POSITIONS THEREOF

BACKGROUND OF THE INVENTION

1. Field of the Invention

The present invention relates to an air pump and, particularly, to an air pump including an air pressure gauge having indicators on different sides and connected thereto and being movable between use positions thereof.

2. Description of the Related Art

TW Patent No. 1403644 shows air pump with a pressure gauge including a base, a pumping hose connected to the base, a cylinder mounted on the base, a piston rod reciprocally operable with respect to the cylinder, a discharge hose fluidly connected to the cylinder, and a pressure gauge attached to the cylinder. In order to be small, yet measures accurately and allows a user to read easily and correctly, the pressure gauge normally has a dial and a dial indicator, as well as a small measuring range. However, since the pressure gauge does not have a large measuring range, its use is limited.

The present invention is, therefore, intended to obviate or at least alleviate the problems encountered in the prior art.

SUMMARY OF THE INVENTION

According to the present invention, an air pump with a pressure gauge comprises: an air pump including a barrel and a pumping device moving with respect to the barrel when the air pump is operated; a joint assembly fluidly connecting to the air pump, disposed on the barrel, and including a first hole to receive air from the air pump; a connecting device including a rotatable adaptor and a second hole extending through the rotatable adaptor and fluidly connecting to the first hole; and a pressure gauge connecting to the joint assembly, disposed on the rotatable adaptor, including an air inlet hole fluidly connecting to the second hole, having a first side thereof including a first dial with a first measuring range and a second side thereof including a second dial with a second measuring range different from the first measuring range, and being rotatable between use positions thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

FIGS. 1 through 15 show an air pump with a pressure gauge in accordance with the present invention including an air pump and a pressure gauge 70.

Figure 8:
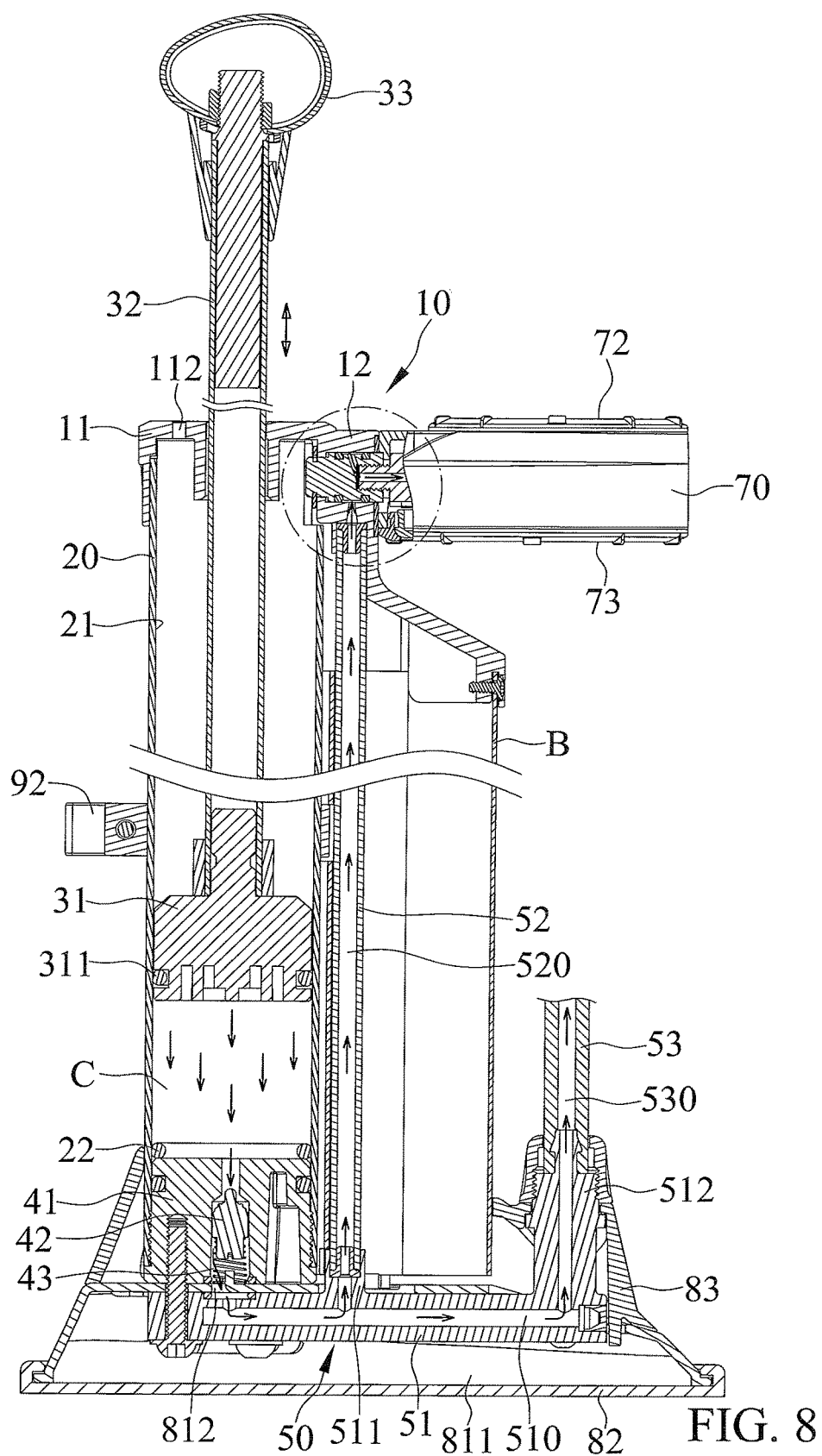
FIG. 8 is a cross-sectional view taken along line 8-8 of FIG. 7, with arrows in the air pump indicating air flows.
Figure 9:
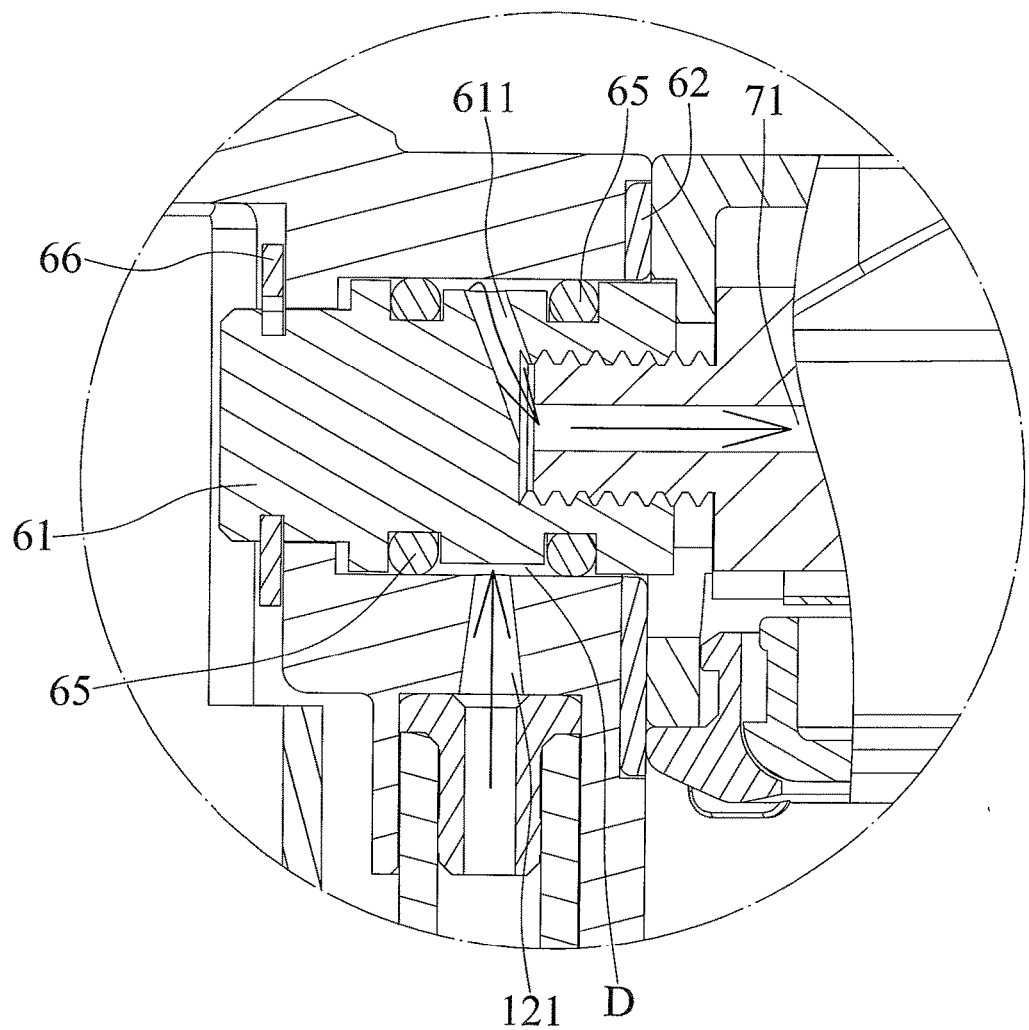
FIG. 9 is a partial, enlarged view of FIG. 8.
Figure 10:
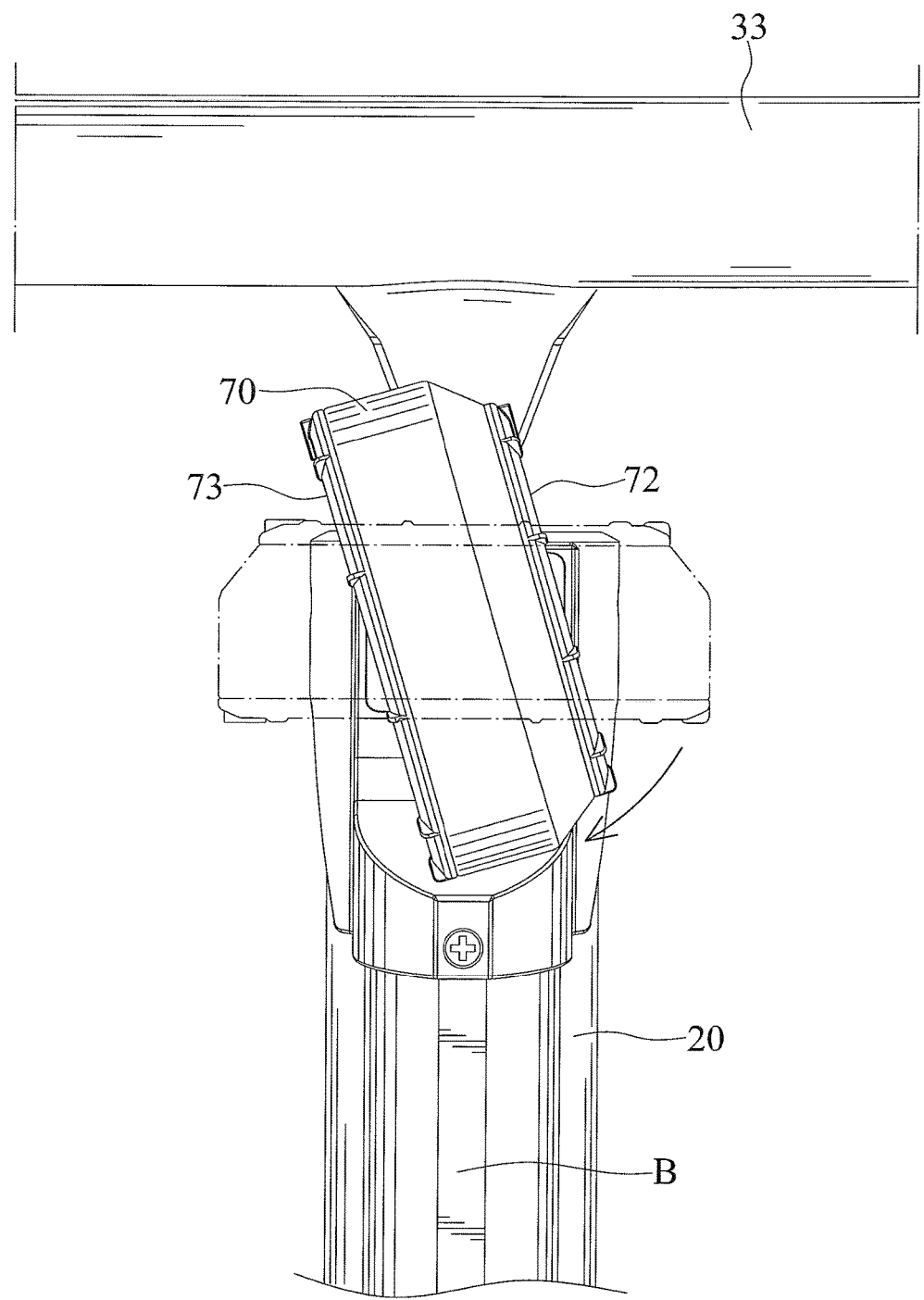
FIG. 10 is an illustrative view showing the pressure gauge movable between use positions thereof
Figure 11:
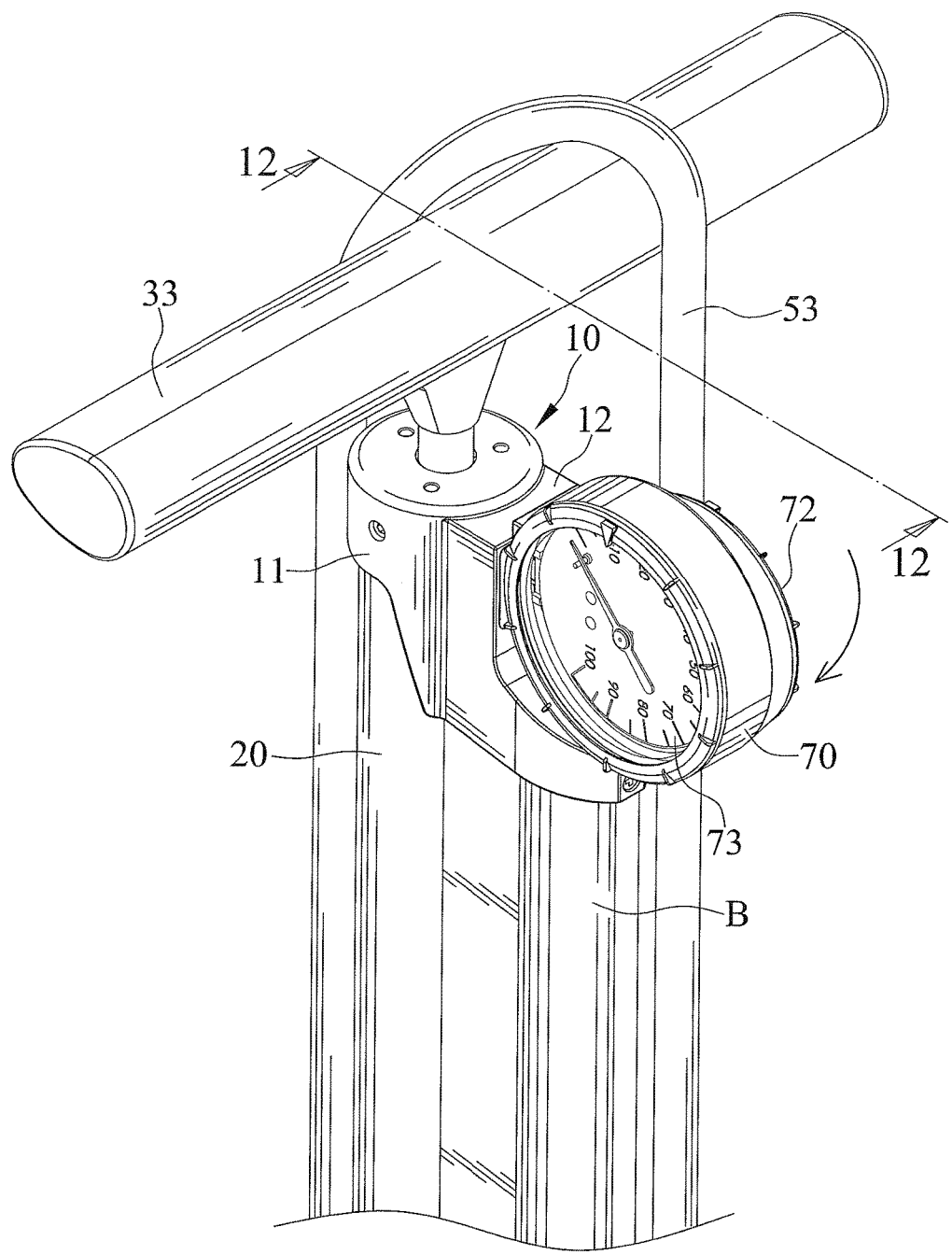
FIG. 11 is a partial, perspective view showing the pressure gauge rotated 90 degrees from the position shown in FIG. 1.
Figure 12:
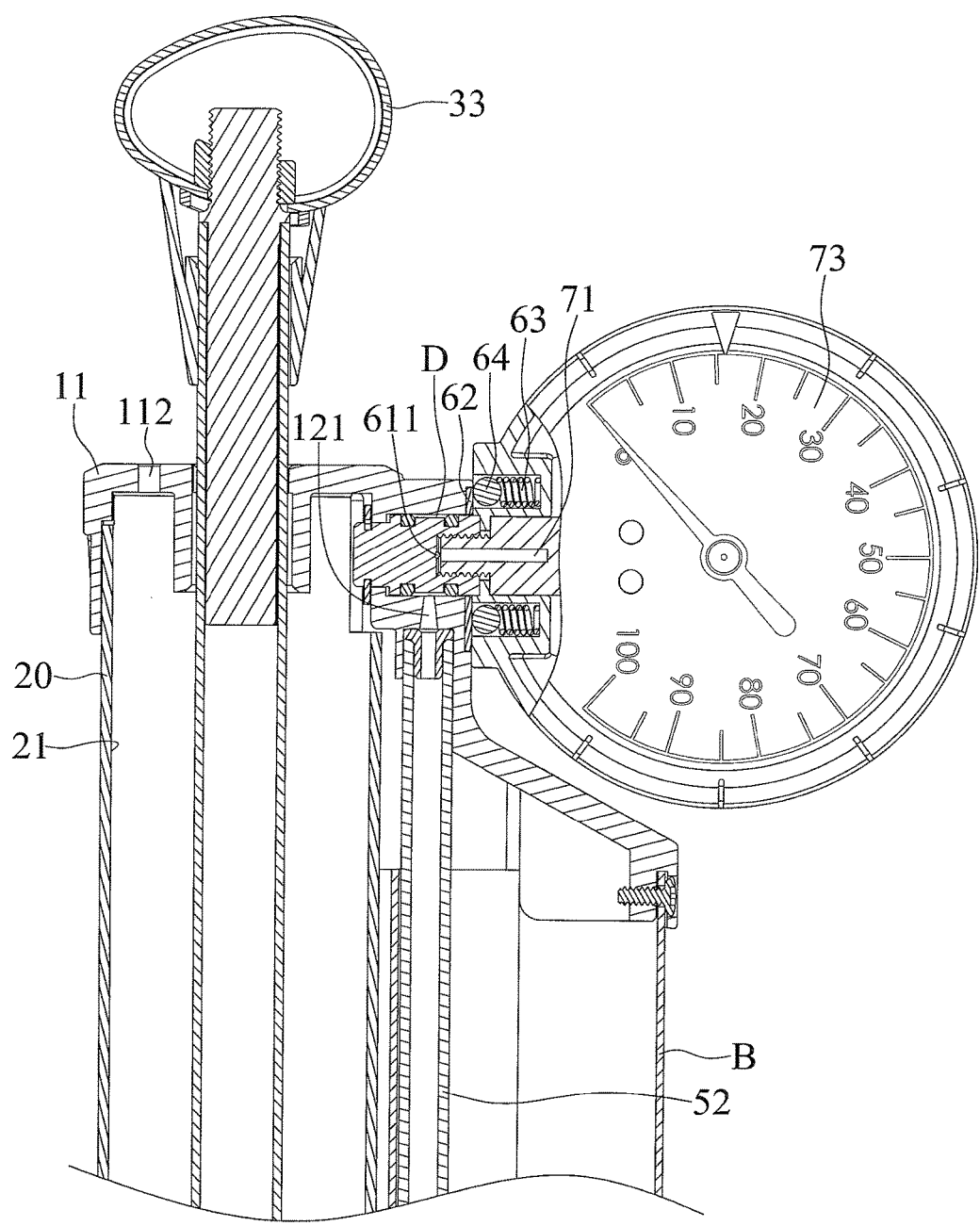
FIG. 12 is a cross-sectional view taken along line 12-12 of FIG. 11.
Figure 13:
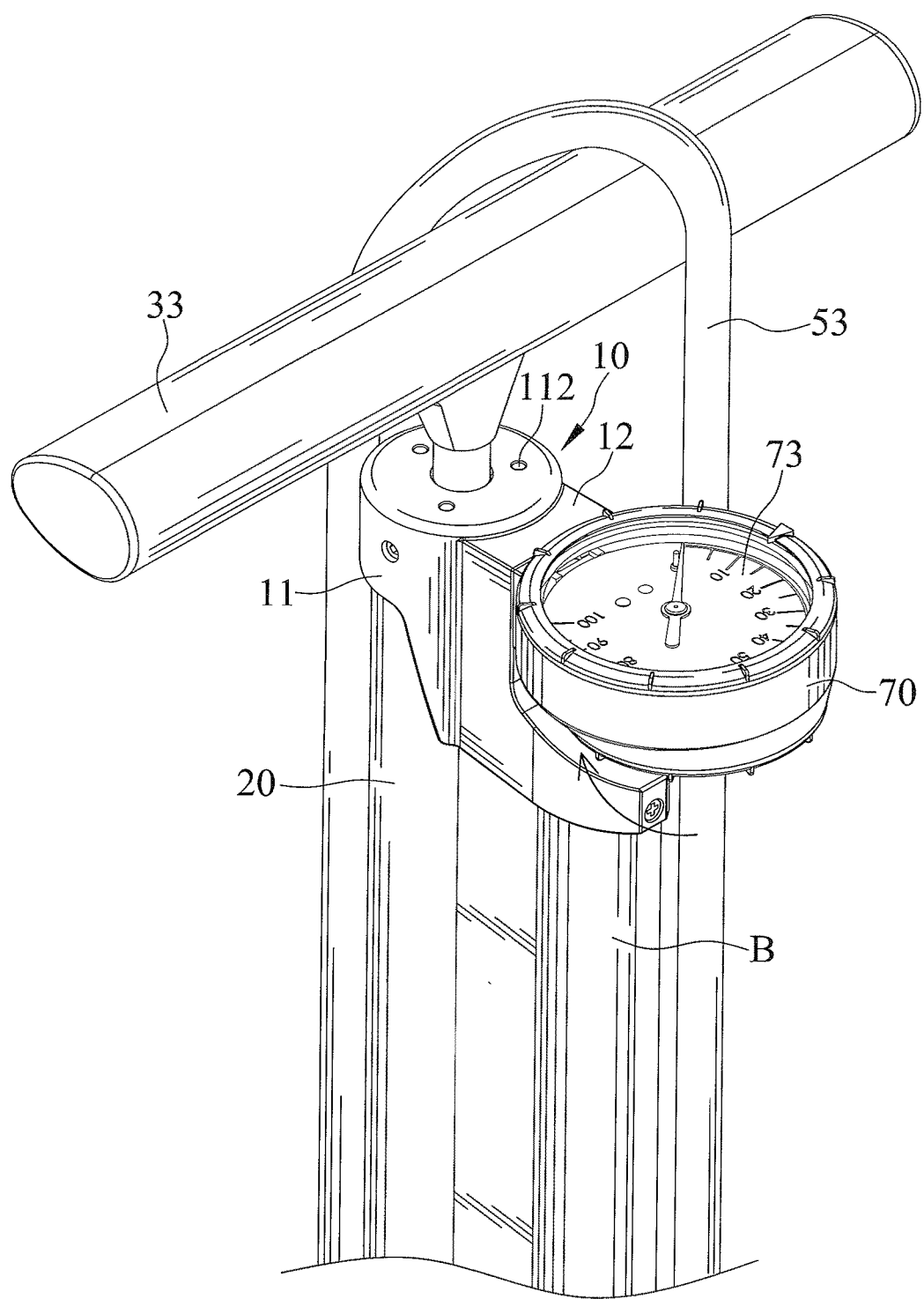
FIG. 13 is a partial, perspective view showing the pressure gauge rotated 180 degrees from the position shown in FIG. 1.
Figure 14:
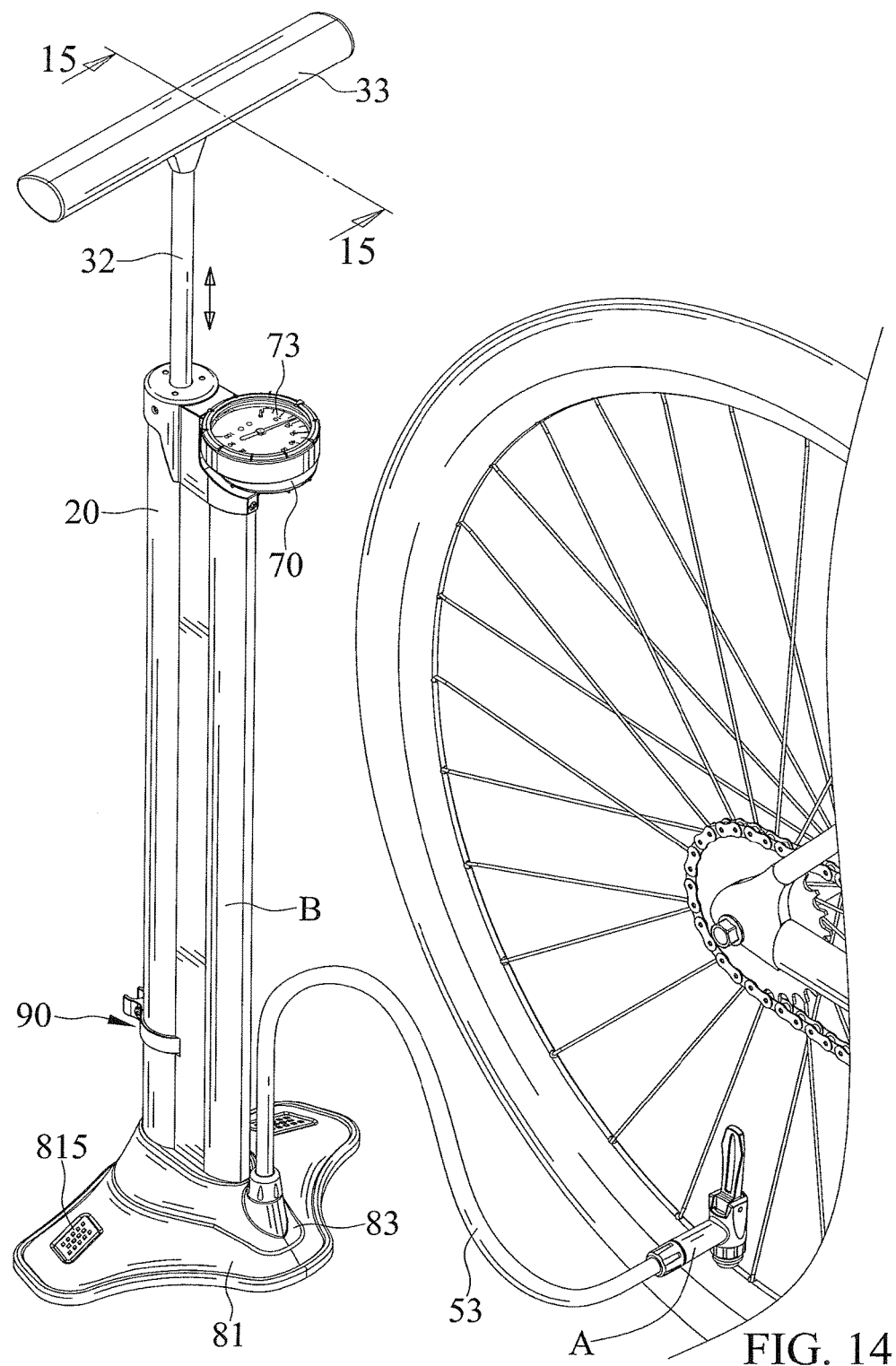
FIG. 14 is a perspective view showing the air pump in use to pump a tire and the pressure gauge in use to measure a tire pressure within a measuring range different from that used in FIG. 7.
Figure 15:
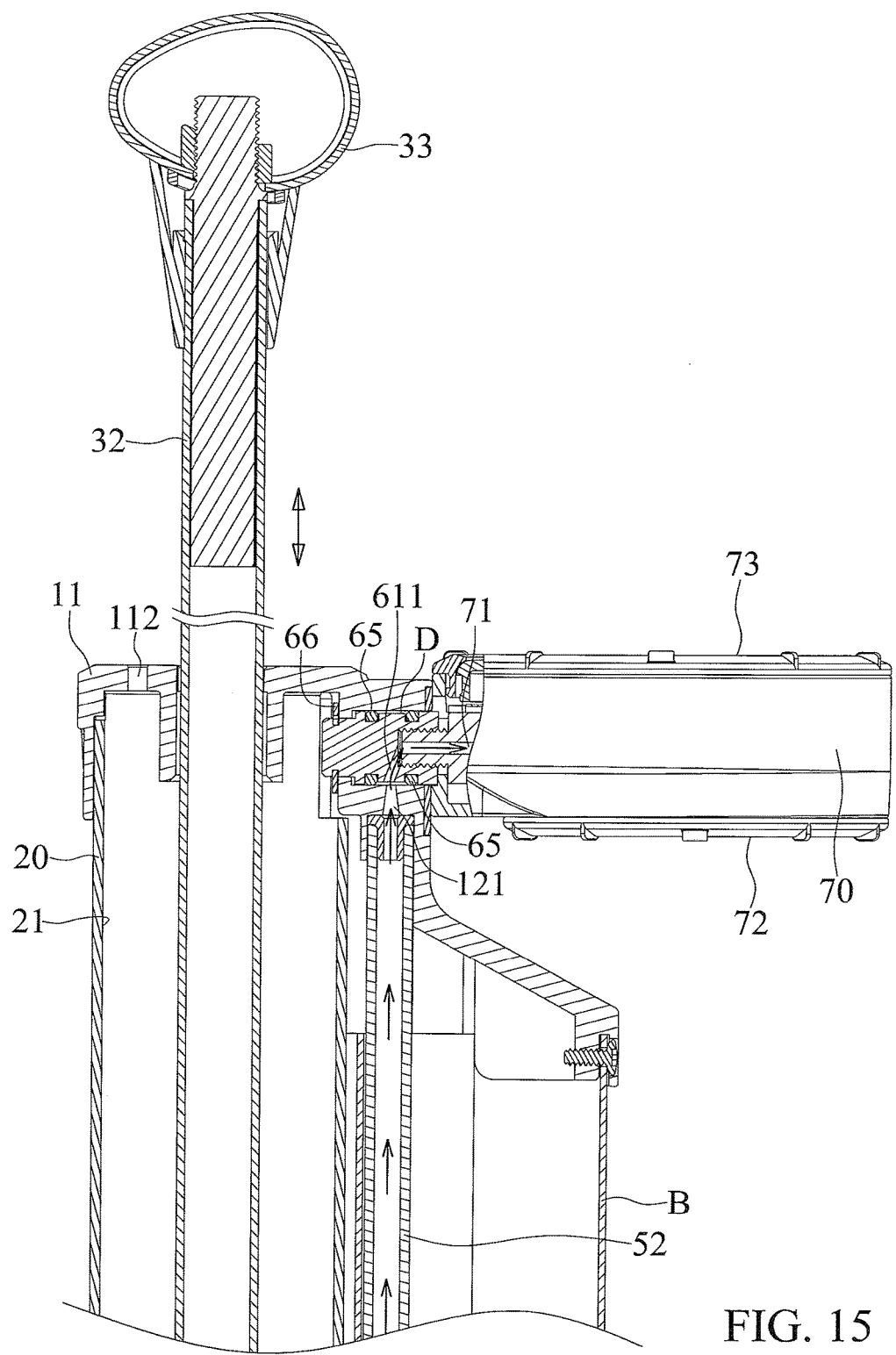
FIG. 15 is a cross-sectional view taken along line 15-15 of FIG. 14.

The air pump includes a barrel 20 and a pumping device 30. The pumping device 30 reciprocally moves with respect to the barrel 20 when the air pump is operated. The barrel 20 has an open end. The pumping device 30 includes a shaft 32 and a piston 31 connecting to an end of the shaft 32 and disposed inside the barrel 20. The shaft 32 can insert through the open end of the barrel 20. A user can operably move the pumping device 30 with a handle 33. The handle 33 connects to another end of the shaft 32 and is disposed outside the barrel 20. The handle 33 and the shaft 32 are in a form of a letter T. A resilient air leakage stopper 311 is mounted on the piston 31. When the piston 31 pushes air in the barrel 20, the air leakage stopper 311 can prevent air from leaking through a clearance between the piston 31 and an inner wall of the barrel 20. As shown in FIG. 8, air in a chamber C is prevented from leaking through the clearance between the piston 31 and the inner wall of the barrel 20. A valve set 40 restricts air traveling from the barrel 20 to the pressure gauge 70. The valve set 40 includes a seat 41 secured to an interior 21 of the barrel 20 and including an air passage 411 fluidly connecting to a section of the barrel 20 that receives the pumping device 30 at one side and the pressure gauge 70 at another side, includes a plug 42 engaging with the seat 41 and being movable to selectively block the air passage 411, and includes a biasing member 43 engaging with and exerting a biasing force on the plug 42. A buffer 22 is disposed between the piston 31 and the seat 41. The air passage 411 has a first section 4111 of a first diametrical size and a second section 4112 of a second diametrical size, which is larger than the first diametrical size. The plug 42 is configured to selectively block the first section of the air passage 411. The biasing member 43 is in a form of a spring. The spring includes coils. A fluid transporting system 50 includes a first tube 51 defining a first fluid passage 510, a second tube 52 defining a second fluid passage 520, and a third tube 53 defining a third fluid passage 530, respectively.

A joint assembly 10 fluidly connects to the air pump, is disposed on the barrel 20, and includes a first hole 121 to receive air from the air pump, a connecting device 60 including a rotatable adaptor 61, and a second hole 611 extending through the rotatable adaptor 61 and fluidly connecting to the first hole 121. The joint assembly 10 includes a fixture. The fixture connects to and caps the open end of the barrel 20. The fixture includes a first structure 11 disposed corresponding to and capping the open end of the barrel 20, and a second structure 12 protruding from the first structure 11. The shaft 32 can insert through the first channel 111 of the first structure 11 of the fixture. The first structure 11 includes a first channel 111 extending therethrough. The first structure 11 also includes at least one orifice 112 extending therethrough. The at least one orifice 112 fluidly connects to the barrel 20 and allows outside air to flow into the barrel 20. The second structure 12 includes a second channel 122 extending therethrough and delimiting a tube D that fluidly connects to the first hole 121. The connecting device 60 connects to the fixture. The rotatable adaptor 61 engages in the second channel 122. The rotatable adaptor 61 is rotatable in the second channel 122. Two resilient air leakage stoppers 65 are mounted on the rotatable adaptor 61. When air flows into the second hole 611, the air leakage stoppers 65 can prevent air from leaking through a clearance between the rotatable adaptor 61 and an inner wall of the second channel 122. A retainer 66 is used to constrain the rotatable adaptor 61 in the second channel 122. The retainer 66 is in a form of a C-clip.

The pressure gauge 70 connects to joint assembly 10 and is disposed on the rotatable adaptor 61. The pressure gauge 70 includes an air inlet hole 71 fluidly connecting to the second hole 611. The pressure gauge 70 is rotatable between use positions thereof. The pressure gauge 70 has a first side thereof including a first dial 72 with a first measuring range and a second side thereof including a second dial 73 with a second measuring range different from the first measuring range. The first dial 72 has a measuring range of 0-15 psi. The first dial 72 has 15 graduations. The second dial 73 has a measuring range of 0-100 psi. The second dial has 20 graduations. The pressure gauge 70 in a first use position thereof includes the first dial 72 facing with a predetermined aspect that allows the user to observe easily and to read a measurement precisely. The pressure gauge 70 has a second use position thereof including the second dial 73 facing with the predetermined aspect. A first dial indicator is on the first dial 72, and a second dial indicator is on the second dial 73, respectively. The first and second dial indicators are linked and movable together. Therefore, the pressure gauge 70 has a simple design, is not pricy, and can be assembled easily and quickly.

The connecting device 60 includes a position-fixing unit engaging with and releasably limiting the pressure gauge 70 in one of the use positions thereof. The position-fixing unit includes at least one elastic member 63 and at least one detent member 64 biased by the at least one elastic member 63. The at least one detent member 64 selectively engages in one of recesses 621, with the at least one detent member 64 restrained in one of the recesses 621 when the pressure gauge 70 is limited in one of the use positions thereof, and with the at least one detent member 64 disengaged from any of the recesses 621 when the pressure gauge 70 is not limited and in transition between the use positions thereof. The at least one elastic member 63 and detent member 64 are received in at least one cavity 74 extending in the pressure gauge 70. The position-fixing unit includes two elastic members 63 and two detent members 64. The pressure gauge 70 includes two cavities 74 each receiving one elastic member 63 and one detent member 64. The two cavities 74 as well as two of the recesses 621 are radially distal and symmetrical to an axis E. The rotatable adaptor 61 is disposed between the two cavities 74. The two cavities 74 are distal from the rotatable adaptor 61 in the same radial distance. Therefore, the pressure gauge 70 is rotated through a 180 degrees angle between two of the use positions thereof. The recesses 621 extend in the fixture. The recesses 621 also extend in a body 62. The body 62 is fit on the fixture. The body 62 and the fixture are integrated. The body 62 and the fixture may be made into a one piece, non-separable construction. The body 62 includes a through hole 622 corresponding to the second channel 122. The through hole 622 allows the rotatable adaptor 61 to insert into the second channel 122. The detent member 64 is in a form of a sphere.

Figure 1:
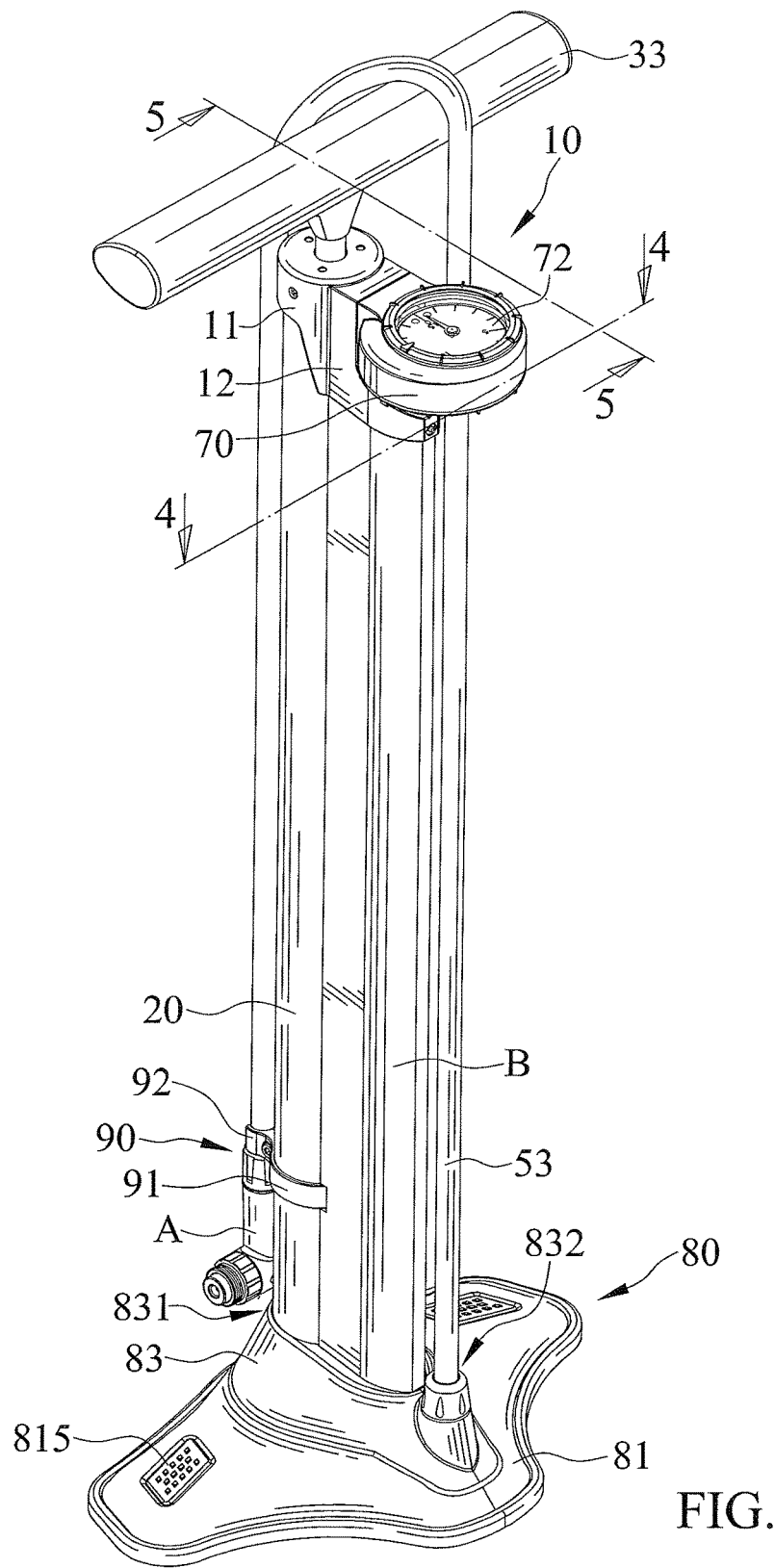
FIG. 1 is a perspective view of an air pump with a pressure gauge in accordance with the present invention.
Figure 2:
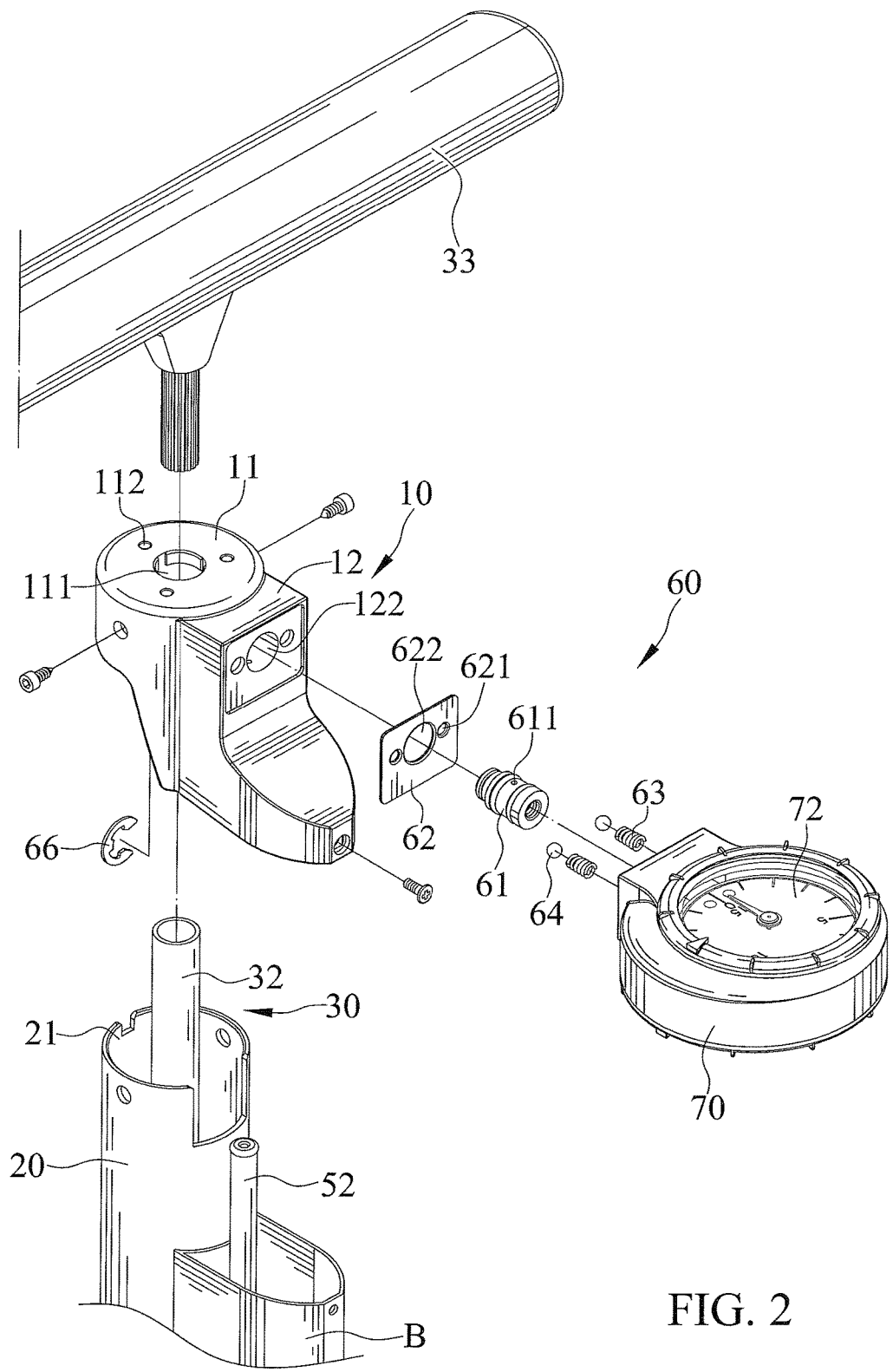
FIG. 2 is a partial, exploded perspective view of FIG. 1.
Figure 3:
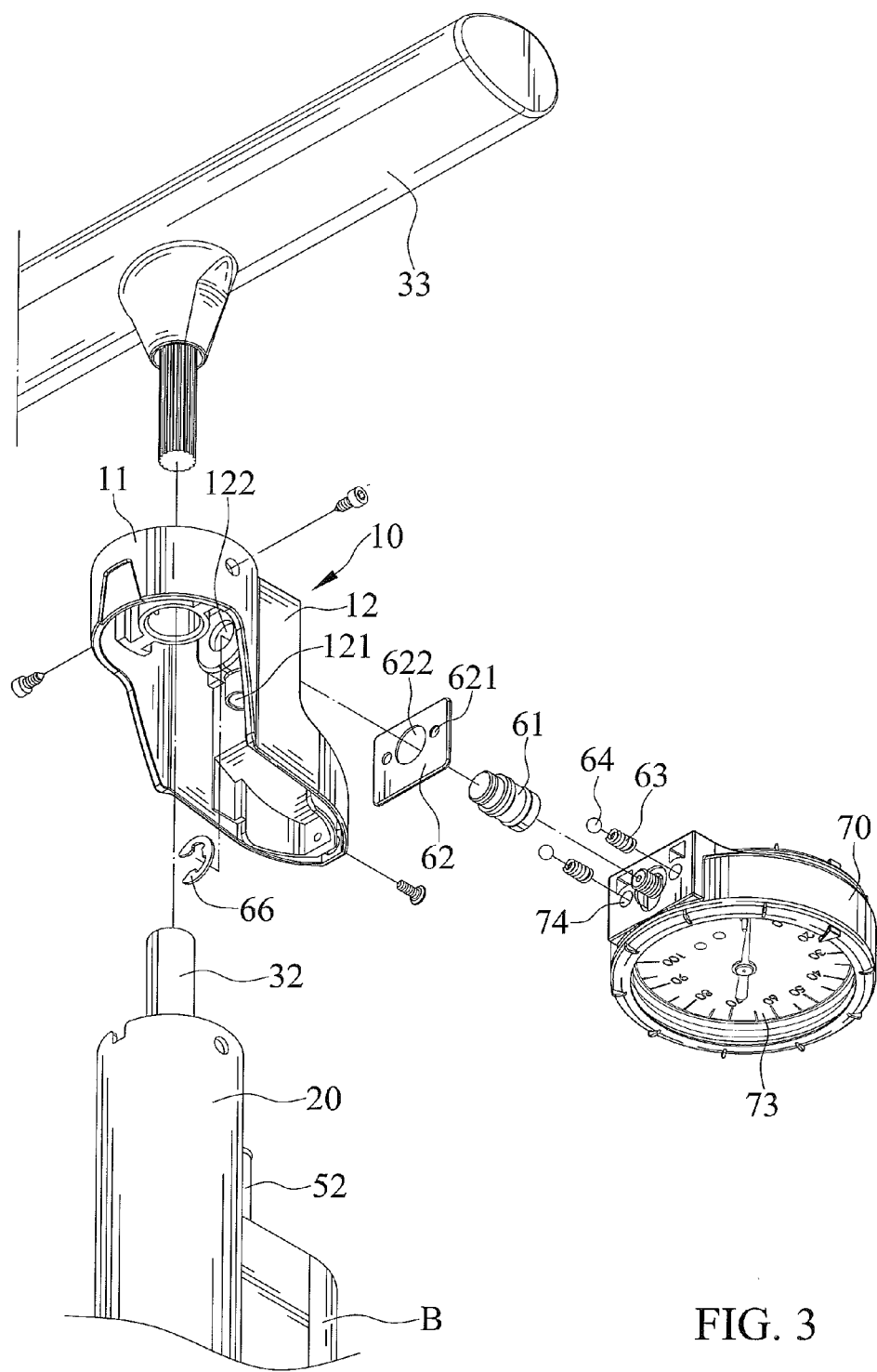
FIG. 3 is similar to FIG. 2, but viewed from a different angle.
Figure 4:
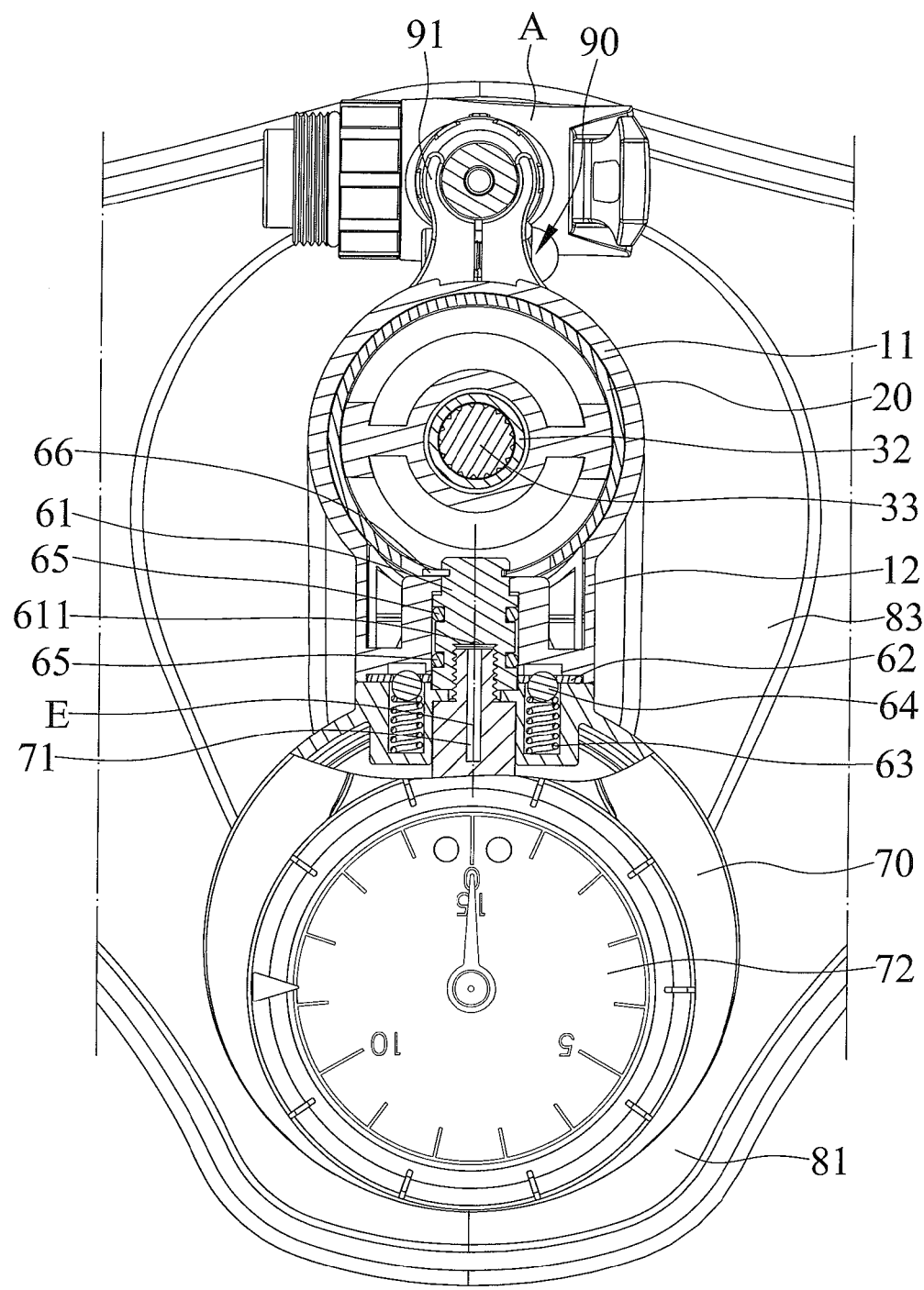
FIG. 4 is a cross-sectional view taken along line 4-4 of FIG. 1.
Figure 5:
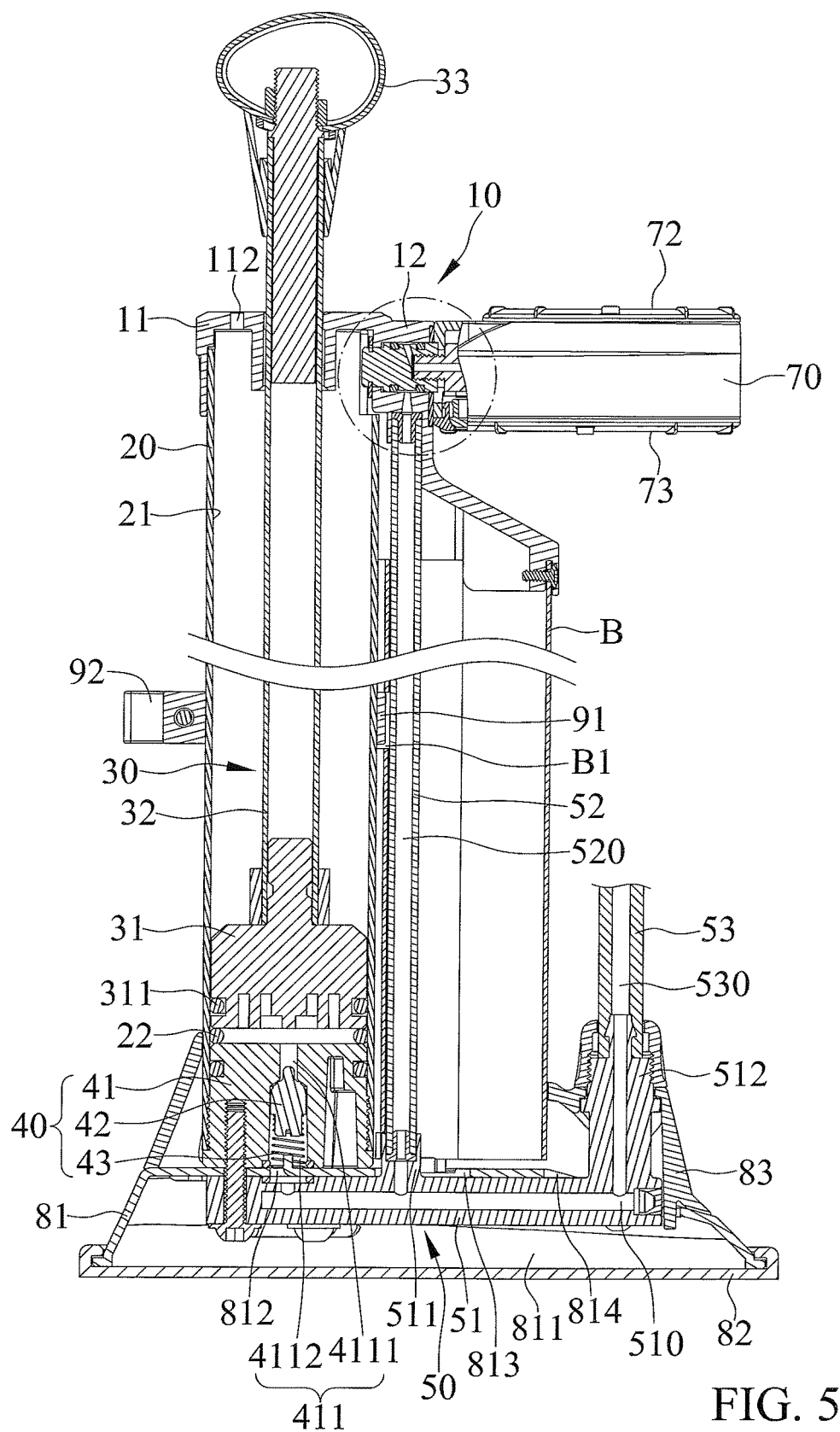
FIG. 5 is a cross-sectional view taken along line 5-5 of FIG. 1.
Figure 6:
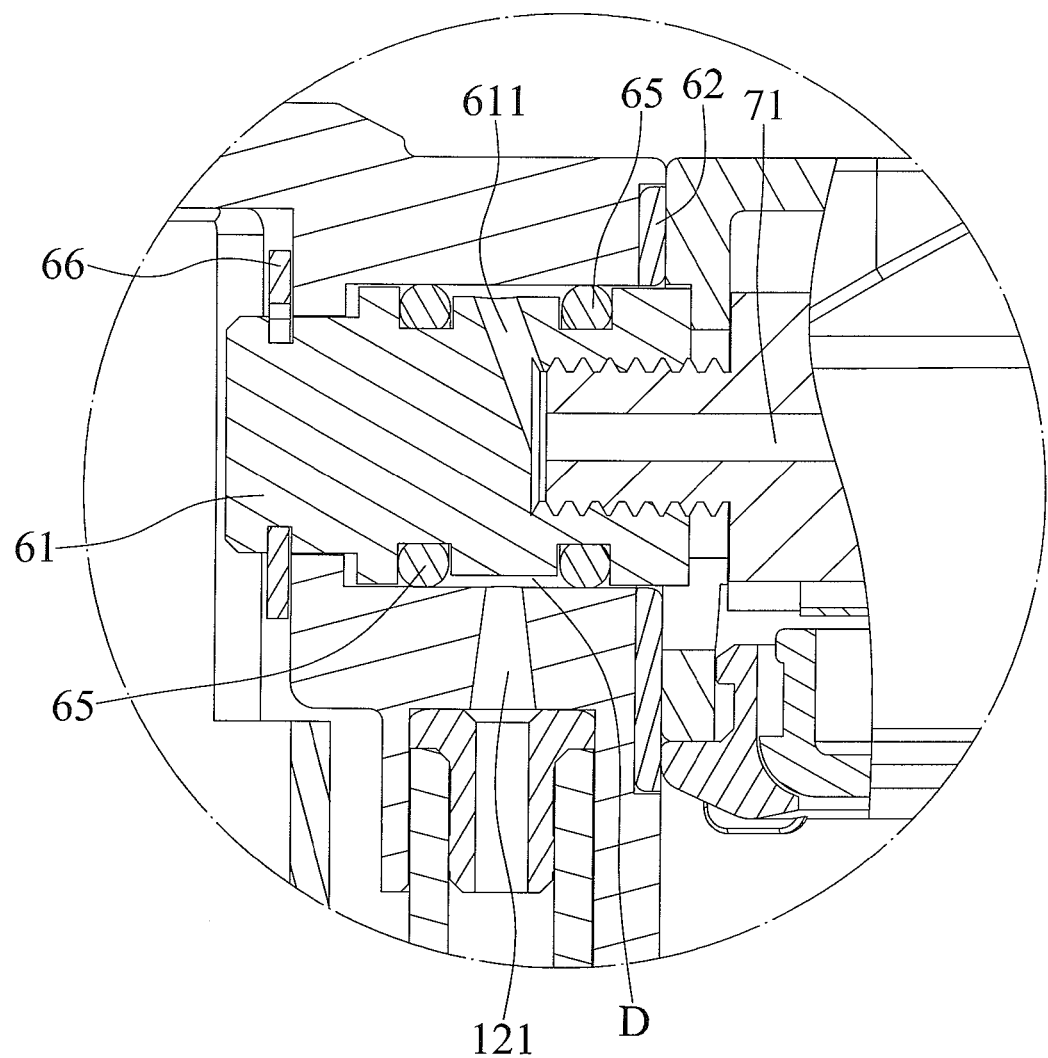
FIG. 6 is a partial, enlarged view of FIG. 5.
Figure 7:
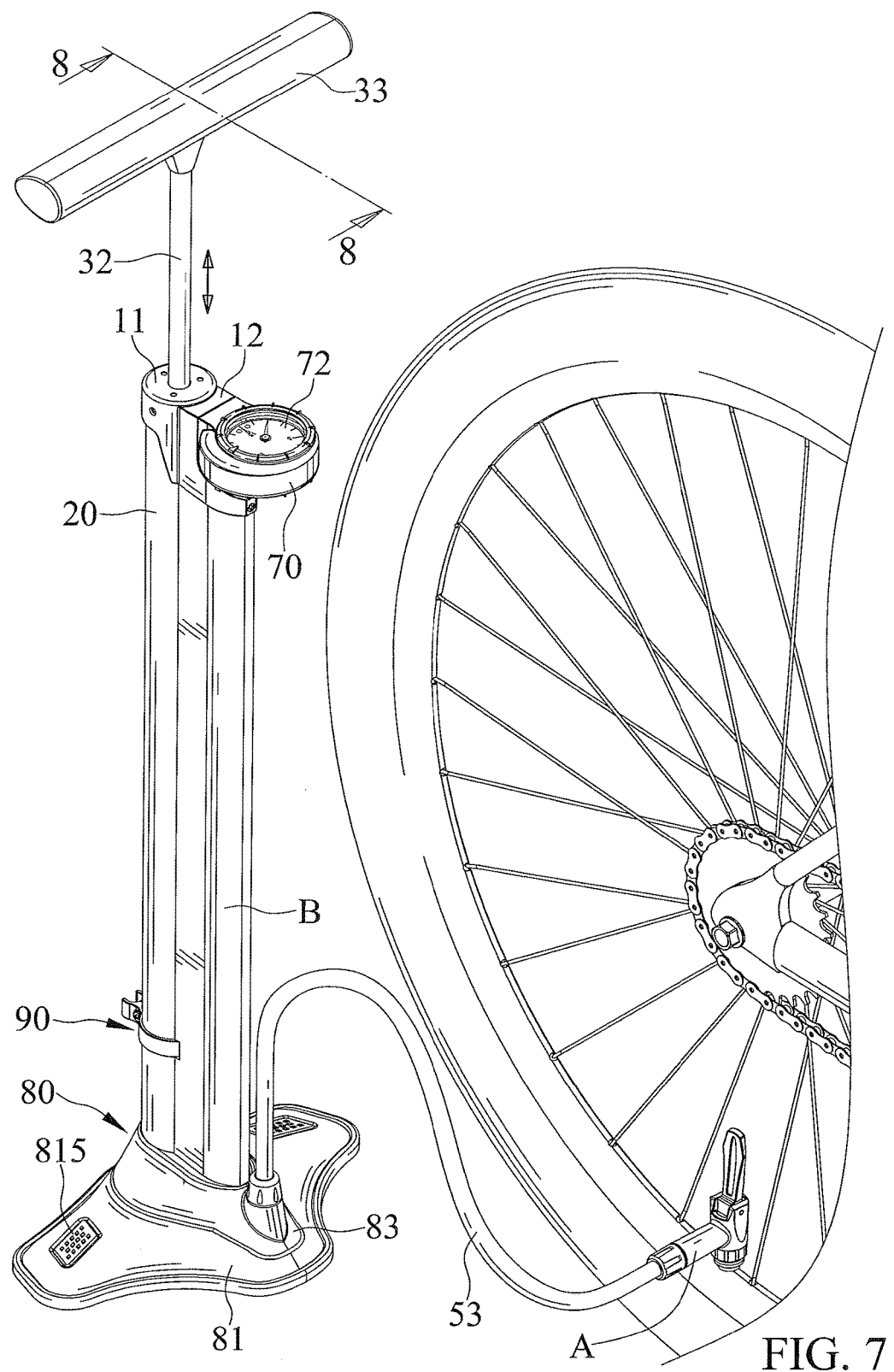
FIG. 7 is a perspective view showing the air pump in use to pump a tire and the pressure gauge in use to measure a tire pressure.

A base 80 bears the barrel 20 and allows the user to secure the air pump in a stable position against the ground when reciprocally moving the pumping device 30 with respect to the barrel 20. A cover 82 caps the bottom of the base 80. A sleeve structure 83 extends from the top of the base 80. The sleeve structure 83 includes a first receptacle 831 and a second receptacle 832. The base 80 includes a structure 81 thereof including a receiving space 811, an aperture 812, a first opening 813, and a second opening 814. The receiving space 811 has an open end. The cover 82 covers the open end of the receiving space 811. The first tube 51 is received in the receiving space 811 and has an opening fluidly connecting to the aperture 812. The first tube 51 includes a first bifurcated extension 511 extending into the first opening 813, and a second bifurcated extension 512 extending into the second opening 814, respectively. The second tube 52 includes a first end thereof connecting to the first bifurcated extension 511 and fluidly connecting to the first tube 51 and a second end thereof connecting to the joint assembly 10 and fluidly connecting to the hole 121, respectively. A shield B connects to the barrel 20 and receives the second tube 52. The shield B and the barrel 20 are integrated. The shield B and the barrel 20 may be made into a one piece, non-separable construction. The first receptacle 831 receives an end of the shield B and an end of the barrel 20. The third tube 53 includes a first end thereof connecting to the second bifurcated extension 512 and fluidly connecting to the first tube 51 and a second end thereof connecting to a pump valve head A, respectively. The second receptacle 832 receives an end of the third tube 53. The third tube 53 is pliable. The third tube 53 has a stored position restraining the handle 33 and in which it includes a first length extending parallel on one side and a second length extending parallel on another side of the barrel 20, as shown in FIG. 1. The handle 33 is restrained by the middle of the third tube 53. A distal end of the second length of the third tube 53 is a free end. A clip 90 connects to the barrel 20 and is distal to the handle 33. The free end of the second length of the third tube 53 is adapted to be restrained by the clip 90. The clip 90 includes a first clipping end 91 clipping the barrel 20 and a second clipping end 92 releasably clipping the free end of the second length of the third tube 53. The first clipping end 91 of the clip 90 extends through a through slot B1, which extends between the barrel 20 and the shield B.

When using the air pump to inflate an object and the pressure gauge 70 to measure an air pressure inside the object instantly, the object to be inflated is connected to the pump valve head A, so pressurized air can be pumped from the barrel 20 by the pumping device 30 to the object and the pressure gauge 70. In addition, the user can secure the air pump by resting feet on a standing area 815 of the base 80.

In view of the forgoing, the pressure gauge 70 is operably movable between the use positions thereof and includes the first and second dials 72 and 73 thereof disposed differently. The pressure gauge 70 can be rotated between the use positions thereof. The first and second dials 72 and 73 are on different sides of the pressure gauge 70. The first and second measuring ranges are different from one another.

The foregoing is merely illustrative of the principles of this invention, and various modifications can be made by those skilled in the art without departing from the scope and spirit of the invention.

What is claimed is:

1. An air pump assembly comprising:
   an air pump including a barrel and a pumping device, with the pumping device moving with respect to the barrel when the air pump is operated;
   a joint assembly fluidly connecting to the air pump, disposed on the barrel, and including a first hole to receive air from the air pump, a connecting device including a rotatable adaptor, and a second hole extending through the rotatable adaptor and fluidly connecting to the first hole; and
   a pressure gauge connecting to the joint assembly, disposed on the rotatable adaptor, including an air inlet hole fluidly connecting to the second hole, having a first side thereof including a first dial with a first measuring range and a second side thereof including a second dial with a second measuring range different from the first measuring range, and being rotatable between use positions thereof, wherein the connecting device includes a position-fixing unit engaging with and releasably limiting the pressure gauge in one of the use positions thereof, wherein the position-fixing unit includes at least one elastic member, at least one detent member biased by the at least one elastic member, and a recess, wherein the at least one detent member selectively engages in the recess, with the at least one detent member restrained in the recess when the pressure gauge is limited in one of the use positions thereof, and with the at least one detent member disengaged from the recess when the pressure gauge is not limited and in transition between the use positions thereof.

2. The air pump assembly as claimed in claim 1, wherein the pressure gauge in a first use position thereof includes the first dial facing with a predetermined aspect that allows a user to observe easily and read a measurement precisely, and wherein the pressure gauge has a second use position thereof including the second dial facing with the predetermined aspect.

3. The air pump assembly as claimed in claim 1, wherein the at least one elastic member and the at least one detent member are received in at least one cavity extending in the pressure gauge, and wherein the joint assembly includes a fixture with the recess extending in the fixture.

4. The air pump assembly as claimed in claim 2, wherein the at least one elastic member and detent member are received in at least one cavity extending in the pressure gauge, and wherein the joint assembly includes a fixture with the recess extending in the fixture.

5. The air pump assembly as claimed in claim 3, wherein the barrel has an open end, and wherein the joint assembly includes the fixture connecting to and capping the open end of the barrel.

6. The air pump assembly as claimed in claim 4, wherein the barrel has an open end, and wherein the joint assembly includes the fixture connecting to and capping the open end of the barrel.

7. The air pump assembly as claimed in claim 1, wherein the position-fixing unit includes another recess, wherein the at least one elastic member and the at least one detent member comprise two elastic members and two detent members, wherein the pressure gauge includes two cavities each receiving one of the two elastic members and one of the two detent members, and wherein the two cavities as well as the recess and the other recess are radially distal and symmetrical to an axis.

8. The air pump assembly as claimed in claim 2, wherein the position-fixing unit includes another recess, wherein the at least one elastic member and the at least one detent member comprise two elastic members and two detent members, wherein the pressure gauge includes two cavities each receiving one of the two elastic members and one of the two detent members, and wherein the two cavities as well as the recess and the other recess are radially distal and symmetrical to an axis.

9. The air pump assembly as claimed in claim 7, wherein the rotatable adaptor is disposed between the two cavities, with the two cavities distal from the rotatable adaptor in a same radial distance.

10. The air pump assembly as claimed in claim 8, wherein the rotatable adaptor is disposed between the two cavities, with the two cavities distal from the rotatable adaptor in a same radial distance.

11. The air pump assembly as claimed in claim 1 further comprising a first dial indicator on the first dial and a second dial indicator on the second dial respectively, and wherein the first and second dial indicators are linked and movable together.

12. The air pump assembly as claimed in claim 2 further comprising a first dial indicator on the first dial and a second dial indicator on the second dial respectively, and wherein the first and second dial indicators are linked and movable together.

13. The air pump assembly as claimed in claim 3 further comprising a first dial indicator on the first dial and a second dial indicator on the second dial respectively, and wherein the first and second dial indicators are linked and movable together.

14. The air pump assembly as claimed in claim 1 further comprising a valve set including a seat secured to an interior of the barrel and including an air passage fluidly connecting to a section of the barrel that receives the pumping device at one side and the pressure gauge at another side, a plug engaging with the seat and being movable to selectively block the air passage, and a biasing member engaging with and exerting a biasing force on the plug.

15. The air pump assembly as claimed in claim 2 further comprising a valve set including a seat secured to an interior of the barrel and including an air passage fluidly connecting to a section of the barrel that receives the pumping device at one side and the pressure gauge at another side, a plug engaging with the seat and being movable to selectively block the air passage, and a biasing member engaging with and exerting a biasing force on the plug.

16. The air pump assembly as claimed in claim 3 further comprising a valve set including a seat secured to an interior of the barrel and including an air passage fluidly connecting to a section of the barrel that receives the pumping device at one side and the pressure gauge at another side, a plug engaging with the seat and being movable to selectively block the air passage, and a biasing member engaging with and exerting a biasing force on the plug.

\* \* \* \* \*